US012282276B2

(12) United States Patent
Watanabe et al.

(10) Patent No.: US 12,282,276 B2
(45) Date of Patent: Apr. 22, 2025

(54) IMAGE FORMING METHOD AND IMAGE FORMING APPARATUS

(71) Applicants: Yohhei Watanabe, Kanagawa (JP); Kenji Ishii, Kanagawa (JP); Kaori Hemmi, Kanagawa (JP)

(72) Inventors: Yohhei Watanabe, Kanagawa (JP); Kenji Ishii, Kanagawa (JP); Kaori Hemmi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/520,561

(22) Filed: Nov. 28, 2023

(65) Prior Publication Data

US 2024/0176267 A1 May 30, 2024

(30) Foreign Application Priority Data

Nov. 29, 2022 (JP) ................................ 2022-190046
Sep. 19, 2023 (JP) ................................ 2023-151507

(51) Int. Cl.
*G03G 15/20* (2006.01)

(52) U.S. Cl.
CPC ..... *G03G 15/2039* (2013.01); *G03G 15/2064* (2013.01)

(58) Field of Classification Search
CPC ....................... G03G 15/2039; G03G 15/2064
See application file for complete search history.

(56) References Cited

U.S. PATENT DOCUMENTS

2012/0028175 A1* 2/2012 Uchino .............. G03G 9/08708 430/48
2014/0219672 A1* 8/2014 Samei ................ G03G 15/2039 399/334
2015/0145936 A1* 5/2015 Plaia .................. B41J 11/00214 347/102
2020/0089147 A1 3/2020 Hasegawa et al.
2020/0292973 A1 9/2020 Furuichi et al.
2021/0041813 A1 2/2021 Watanabe
2021/0088948 A1 3/2021 Hemmi et al.
2021/0200124 A1 7/2021 Watanabe et al.
2022/0075310 A1 3/2022 Kabata et al.
2023/0024199 A1 1/2023 Makino et al.

FOREIGN PATENT DOCUMENTS

JP 2012-048221 A 3/2012
JP 2020-196551 A 12/2020

* cited by examiner

*Primary Examiner* — Stephanie E Bloss
*Assistant Examiner* — Michael A Harrison
(74) *Attorney, Agent, or Firm* — XSENSUS LLP

(57) ABSTRACT

An image forming method to be performed by an image forming apparatus includes forming, transferring, fixing, and drying. The forming forms a foil portion to which foil is adhered on one surface of a recording medium. The transferring transfers an image to the one surface of the recording medium after the forming of the foil portion. The fixing fixes the image transferred to the one surface of the recording medium by the transferring of the image, to form a foil image portion including the foil portion and the image on the recording medium. The drying dries the recording medium on which the foil portion is formed, between the forming of the foil portion and the transferring of the image.

8 Claims, 7 Drawing Sheets

IMAGE FORMING METHOD AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-190046, filed on Nov. 29, 2022, and No. 2023-151507, filed on Sep. 19, 2023, in the Japan Patent Office, the entire disclosure of each of which is hereby incorporated by reference herein.

BACKGROUND

Technical Field

Embodiments of the present disclosure relate to an image forming method and an image forming apparatus.

Related Art

A digital foil processing method that can form a foil portion on a surface of a recording medium on which a digital image can be formed to express a metallic tone excellent in glossiness is widely known. The image formed by the foil portion is superior in glossiness to an image formed by using so-called metallic toner from the viewpoint of surface glossiness, and can be expressed with a higher-quality feeling. In such a digital foil processing method, there is known an image forming method in which further image formation is performed on a surface of the foil portion to form a foil image portion (overprinting method) to perform full-color expression of various metallic tones.

SUMMARY

According to an embodiment of the present disclosure, an image forming method to be performed by an image forming apparatus includes forming, transferring, fixing, and drying. The forming forms a foil portion to which foil is adhered on one surface of a recording medium. The transferring transfers an image to the one surface of the recording medium after the forming of the foil portion. The fixing fixes the image transferred to the one surface of the recording medium by the transferring of the image, to form a foil image portion including the foil portion and the image on the recording medium. The drying dries the recording medium on which the foil portion is formed, between the forming of the foil portion and the transferring of the image.

According to another embodiment of the present disclosure, an image forming apparatus is provided to execute the image forming method using a recording medium on one surface of which a foil portion is formed. The image forming apparatus includes an image forming device to form an image; a transfer device to transfer the image formed by the image forming device to the recording medium; a fixing device to fix the image transferred to the one surface of the recording medium; and a reverse conveyor to reverse and convey the recording medium to the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
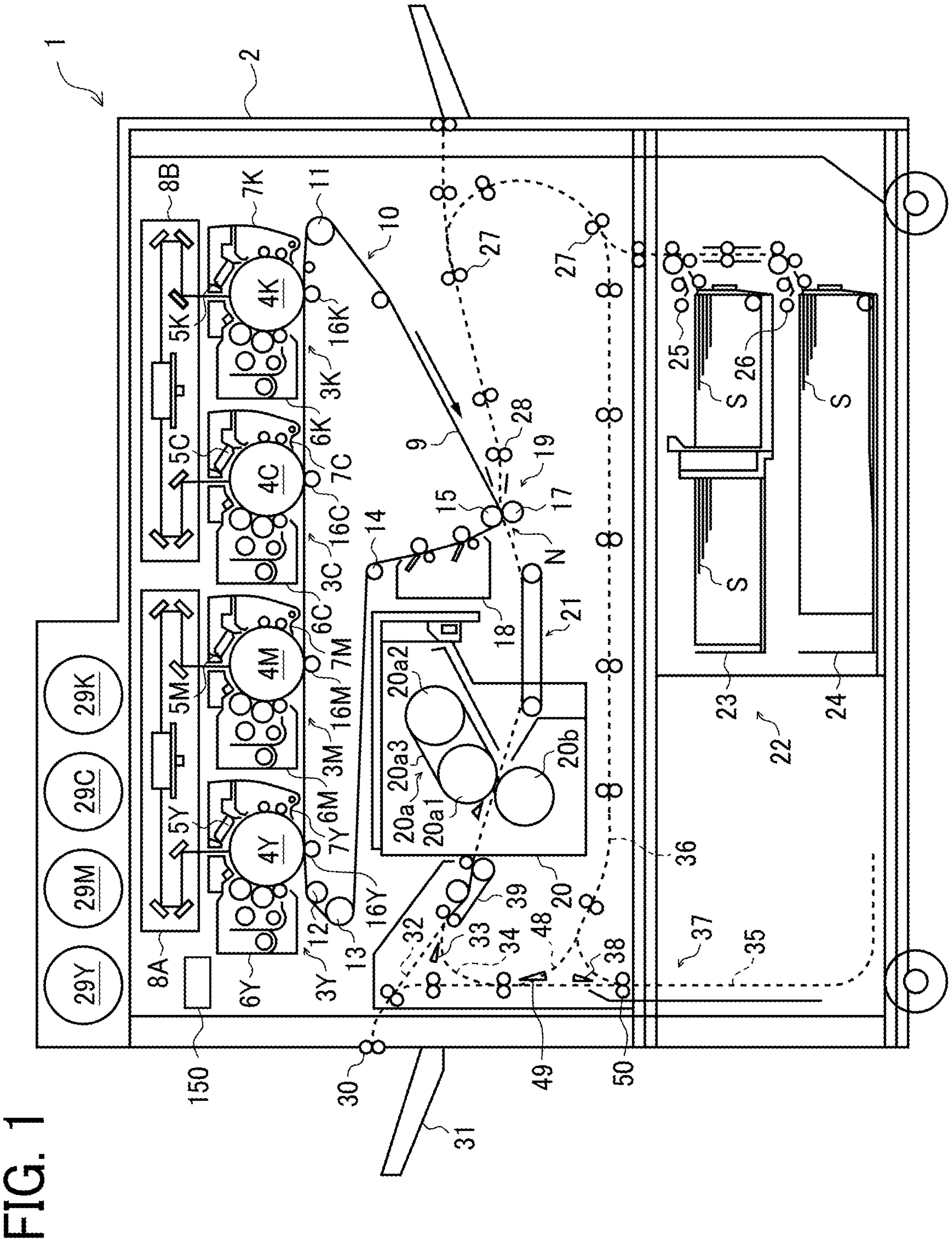
FIG. 1 is a schematic front view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 illustrates a color printer as an image forming apparatus according to an embodiment of the present disclosure. Process cartridges 3Y, 3M, 3C, and 3K as image forming units for forming toner images of respective colors of yellow (Y), magenta (M), cyan (C), and black (K) are disposed in an upper portion of an apparatus main body 2 of a color printer 1. In the process cartridges 3, corresponding photoconductor drums 4Y, 4M, 4C, and 4K are provided, respectively.

In FIG. 1, charging devices 5Y, 5M, 5C, and 5K, developing devices 6Y, 6M, 6C, and 6K, and photoconductor cleaning devices 7Y, 7C, 7M, and 7K are disposed around the photoconductor drums 4, respectively. An optical unit 8A that irradiates the photoconductor drums 4Y and 4M with laser light is disposed above the process cartridges 3Y and 3M, and an optical unit 8B that irradiates the photoconductor drums 4C and 4K with laser light is disposed above the process cartridges 3C and 3K. Each of the optical units 8A and 8B has a known configuration including a laser light source, a polygon mirror, a plurality of lenses, and a mirror.

An intermediate transfer unit 10 including an intermediate transfer belt 9 to which the toner images formed by the respective process cartridges 3 are transferred is provided below the process cartridges 3. The intermediate transfer unit 10 includes a plurality of rollers that supports the intermediate transfer belt 9, and the intermediate transfer belt 9 is stretched around a driving roller 11, driven rollers 12 and 13, a tension roller 14, and a secondary transfer counter roller 15. Among the rollers 11, 12, 13, 14, and 15, the driving roller 11 is rotationally driven by a driving motor, so that the intermediate transfer belt 9 is driven to travel in a clockwise direction indicated by an arrow in FIG. 1.

Primary transfer rollers 16Y, 16M, 16C, and 16K that primarily transfer the toner images formed on the photoconductor drums 4 onto the intermediate transfer belt 9 are provided at positions facing the photoconductor drums 4 on an inner peripheral side of the intermediate transfer belt 9. Formation of the toner image of each color on each photoconductor drum 4 and primary transfer of the toner image onto the intermediate transfer belt 9 will be described.

Each of the photoconductor drums 4 is rotationally driven in a counterclockwise direction in FIG. 1, each neutralizing device irradiates a surface thereof with neutralizing light, and a surface potential of each of the photoconductor drums 4 is initialized. The initialized surface potential of each photoconductor drum 4 is uniformly charged to a predetermined polarity (negative polarity in the present embodiment) by each charging device 5. The charged surfaces of the photoconductor drums 4 are irradiated with laser beams emitted from the optical units 8A and 8B, and electrostatic latent images corresponding to the images of the respective colors are formed on the surfaces of the photoconductor drums 4.

The electrostatic latent image formed on each photoconductor drum 4 is visualized as the toner image by each developing device 6. A transfer voltage having a polarity (positive polarity in the present embodiment) opposite to that of the toner image formed on each photoconductor drum 4 is applied to each primary transfer roller 16. As a result, a transfer electric field is formed between each photoconductor drum 4 and each primary transfer roller 16 corresponding thereto, and the toner image of each color on each photoconductor drum 4 is electrostatically transferred onto the intermediate transfer belt 9. At that time, the toner images of the respective colors are superimposed and transferred onto the intermediate transfer belt 9, and a full-color toner image is formed on the intermediate transfer belt 9. Each photoconductor drum 4 that transfers the toner image of each color onto the intermediate transfer belt 9 stands by for new image formation after transfer residual toner adhering to the surface thereof is removed by each photoconductor cleaning device 7.

On a downstream side in a travel direction of the intermediate transfer belt 9 from the primary transfer roller 16K, a secondary transfer roller 17 that secondarily transfers the toner image primarily transferred onto the intermediate transfer belt 9 onto a recording medium is provided so as to face the secondary transfer counter roller 15. The secondary transfer roller 17 is contactable to and separable from the intermediate transfer belt 9 stretched around the secondary transfer counter roller 15, and selectively occupies a contact position in contact with the intermediate transfer belt 9 and a separation position separated from the intermediate transfer belt 9. The secondary transfer roller 17 and the secondary transfer counter roller 15 come into contact with each other via the intermediate transfer belt 9 when the secondary transfer roller 17 occupies the contact position to form a secondary transfer nip N, and form a secondary transfer region when the secondary transfer roller 17 occupies the separation position. A predetermined transfer voltage is applied to the secondary transfer roller 17, so that the toner image formed on the intermediate transfer belt 9 is secondarily transferred onto the recording medium at the secondary transfer nip N. A belt cleaning device 18 that removes residual toner remaining on the intermediate transfer belt 9 after image transfer is provided on the downstream side in the travel direction of the intermediate transfer belt 9 from the secondary transfer counter roller 15. The intermediate transfer unit 10, the primary transfer rollers 16, the secondary transfer roller 17, and the belt cleaning device 18 described above form a transfer unit 19.

On a left side of the secondary transfer roller 17, a fixing device 20 as a fixing unit including a heating belt 20*a* as a heating device and a pressing roller 20*b* as a pressing device that fixes the toner image secondarily transferred onto the recording medium is disposed. The heating belt 20*a* has a known configuration including a heating roller 20*a*1 including a heating unit such as a heater therein, a driving roller 20*a*2 rotationally driven by a motor, and a belt member 20*a*3 stretched between the rollers 20*a*1 and 20*a*2. The pressing roller 20*b* is biased by a biasing unit, and a peripheral surface thereof is brought into pressure contact with a peripheral surface of the heating roller 20*a*1 with a predetermined pressure contact force via the belt member 20*a*3.

A conveying conveyor 21 that conveys the recording medium that passes through the secondary transfer nip N to the fixing device 20 is provided between the secondary transfer roller 17 and the fixing device 20. The conveying conveyor 21 is a known conveyor including a driving roller, a driven roller, and an endless belt stretched between the rollers. On a downstream side in a recording medium conveyance direction from the fixing device 20, a sheet conveying member 39 formed by bringing a roller in pressure contact with a conveyor is disposed. The sheet conveying member 39 conveys the recording medium to which the fixing is performed by the fixing device 20 to a further downstream side.

A sheet feeding unit 22 is disposed in a lower portion of the apparatus main body 2. The sheet feeding unit 22 includes sheet feed trays 23 and 24, sheet feeding rollers 25 and 26, a plurality of conveying roller pairs 27, and a registration roller pair 28. Transfer sheets S, which are recording media stored in the sheet feed trays 23 and 24, are separated to be fed by the sheet feeding rollers 25 and 26, fed toward the registration roller pair 28 via the conveying roller pair 27, and then temporarily stopped by the registration roller pair 28. The registration roller pair 28 feeds the temporarily stopped transfer sheet S toward the secondary transfer nip N at a predetermined timing when the toner image formed on the intermediate transfer belt 9 comes to a predetermined position of the transfer sheet S.

Toner bottles 29Y, 29M, 29C, and 29K each storing toner of the corresponding color to be supplied to each developing device 6 are disposed in an upper portion of the apparatus main body 2.

When the full-color toner image is formed on the intermediate transfer belt 9, in the sheet feeding unit 22, one transfer sheet S in the sheet feed tray 23 or 24 is separated to be fed by an operation of the sheet feeding roller 25 or 26. The fed transfer sheet S is temporarily stopped by the registration roller pair 28, and then sent to the secondary transfer nip N at a predetermined timing by an operation of the registration roller pair 28. At the secondary transfer nip N, the transfer sheet S to which the full-color toner image formed on the intermediate transfer belt 9 is transferred is sent to the fixing device 20, where the transferred image is fixed. The transfer sheet S to which the image is fixed is conveyed to a sheet ejection path 32, and then ejected onto a sheet ejection tray 31 provided on a side portion of the apparatus main body 2 by an ejection roller pair 30 disposed on a downstream side in a sheet conveyance direction from the fixing device 20. Similarly to the photoconductor drums 4, transfer residual toner remaining on the intermediate transfer belt 9 is cleaned by the belt cleaning device 18. Toner of each color stored in each toner bottle 29 is supplied to the corresponding developing device 6 by a predetermined amount via a toner conveyance path as necessary.

The color printer 1 includes a reverse conveying unit 37 serving as a reverse conveyor including a switching claw 33, a first reconveyance path 34, a switchback path 35, a second reconveyance path 36, and a revolving conveyance path 48, and can execute a double-sided image forming operation of forming an image on both surfaces of the transfer sheet S, and a reconveying operation of conveying an image forming surface of the transfer sheet S on which image formation is performed once to the secondary transfer region again.

Specifically described, at the time of a single-sided image forming operation of forming an image on one surface of the transfer sheet S, the switching claw 33 sets a conveyance destination of the transfer sheet S to the sheet ejection path 32. As a result, the transfer sheet S on one surface of which an image is formed is sent to the ejection roller pair via the sheet ejection path 32 to be ejected onto the sheet ejection tray 31.

During the double-sided image forming operation and the reconveying operation, the switching claw 33 switches a subsequent conveyance destination of the transfer sheet S received from the fixing device 20 to the sheet ejection path 32 or a first reconveyance path 34. At the time of double-sided image formation, in a case of receiving the transfer sheet S on both surfaces of which the toner image is fixed from the fixing device 20, the switching claw 33 sets the conveyance destination of the transfer sheet S to the sheet ejection path 32. As a result, the transfer sheet S on both surfaces of which the image is formed is ejected onto the sheet ejection tray 31 by the ejection roller pair 30.

In contrast, in a case of receiving the transfer sheet S on one surface of which the image is fixed from the fixing device 20 at the time of the double-sided image forming operation, the switching claw 33 sets the conveyance destination of the transfer sheet S to the first reconveyance path 34. The switchback path 35 and the revolving conveyance path 48 are coupled to the first reconveyance path 34, and the transfer sheet S sent to the first reconveyance path 34 is guided by a switching claw 49 to enter the switchback path 35. When the roller pair 50 provided on the switchback path 35 is reversely driven, the transfer sheet S is reversed front and rear and back and forth, and the reversed transfer sheet S is guided by the switching claw 38 to be resent to the secondary transfer nip N via the second reconveyance path 36. The transfer sheet S to which the toner image is transferred also to the other surface at the secondary transfer nip N passes through the fixing device 20 where the toner image is fixed to the other surface thereof, and then ejected onto the sheet ejection tray 31 via the switching claw 33, the sheet ejection path 32, and the ejection roller pair 30.

The revolving conveyance path 48 is used in a case where the transfer sheet S that passes through the fixing device 20 is transferred to the secondary transfer nip N (secondary transfer region) again in a state of not reversed front and rear and back and forth. The transfer sheet S sent to the first reconveyance path 34 is guided by the switching claw 49 to enter the revolving conveyance path 48, and is resent to the secondary transfer nip N via the second reconveyance path 36 in the same posture as described above.

Figure 2:
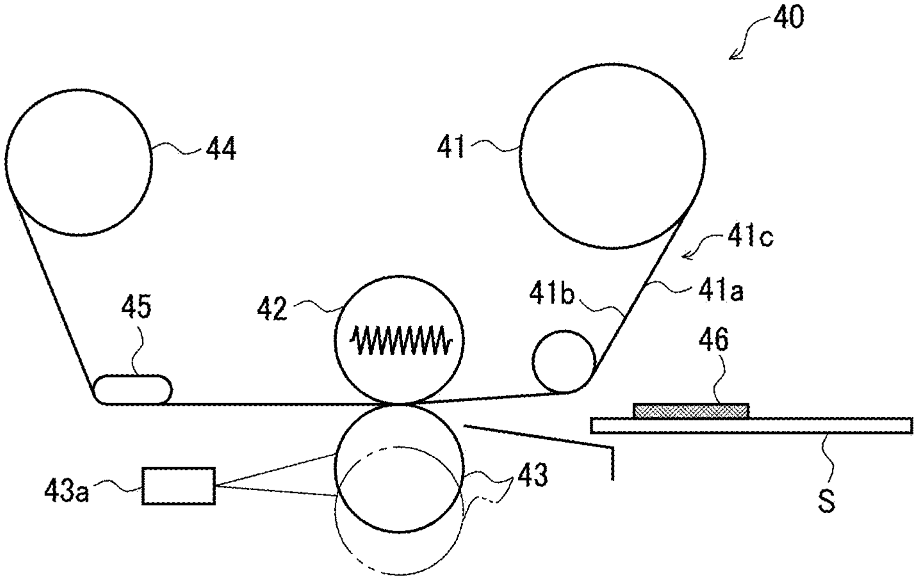
FIG. 2 is a schematic view illustrating a foil portion forming unit according to an embodiment of the present disclosure.

FIG. 2 is a schematic view illustrating a foil transfer device as a foil portion forming device according to an embodiment of the present disclosure. In the drawing, a foil transfer device 40 includes a foil supply roll 41, a heating roller 42, a pressing roller 43, a winding roll 44, and a separation unit 45.

The foil supply roll 41 is formed by winding a foil base sheet 41*c* including a foil 41*a* including an aluminum vapor deposition layer on one surface and a base sheet 41*b* holding the foil 41*a* on the other surface in such a manner that one surface faces outward. In the present embodiment, the foil 41*a* having a thickness of 16 μm is used. The foil 41*a* preferably has a thickness of 12 to 20 μm from the viewpoint of heat transfer and conveyance property. In consideration of the heat transfer, it is preferable that the foil 41*a* is thin, but in order to convey the foil 41*a* excellently without occurrence of wrinkles, rigidity due to a certain thickness is preferable. The heating roller 42 includes a heat source therein, and is disposed corresponding to the other surface of the foil base sheet 41*c*. The heating roller 42 may include an external heat source.

The pressing roller 43 is disposed to face one surface of the foil base sheet 41*c*, and a peripheral surface thereof is brought into pressure contact with a peripheral surface of the heating roller 42 with a predetermined pressure contact force by a biasing unit. The pressing roller 43 is provided with a contact-separation unit 43*a*, and the pressing roller 43 selectively occupies a pressure contact position indicated by a solid line and a separation position indicated by a two-dot chain line in FIG. 2 by an operation of the contact-separation unit 43*a*. When the pressing roller 43 occupies the pressure contact position, the peripheral surface thereof is brought into pressure contact with the peripheral surface of the heating roller 42 with a predetermined pressure contact force, and when this occupies the separation position, the peripheral surface thereof is separated from the peripheral surface of the heating roller 42, and a gap through which the transfer sheet S can pass is generated between the rollers 42 and 43. In the present embodiment, the predetermined pressure contact force with which the peripheral surface of the pressing roller 43 is brought into pressure contact with the peripheral surface of the heating roller 42 is set to 50 $N/cm^2$. The pressure contact force is preferably in a range of 20 to 100 $N/cm^2$ from the viewpoint of foil transferability to a transfer medium and medium conveyance property at a pressure contact portion with the medium. If the pressure contact force is small, it does not follow unevenness of a surface of the transfer medium having poor smoothness, so that sufficient foil transferability cannot be obtained in some cases, and if the pressure contact force is too large, conveyance wrinkles or curls occur in the transfer medium in some cases.

The winding roll 44 includes a core, and by rotating the core, the foil base sheet 41*c* is wound at a predetermined speed. Although the foil supply roll 41 slave-rotates with the rotation of the winding roll 44, this is provided with a stopper so as not to excessively slave-rotate, and the foil base sheet 41*c* is supplied between the rollers 42 and 43 in a state of maintaining a predetermined tension. The predetermined speed at which the foil base sheet 41*c* is wound is preferably 100 to 200 mm/sec.

The separation unit 45 is disposed at a position to provide the base sheet 41*b* with a separation angle for separation from the transfer sheet S in order to separate the transfer sheet S supplied to the foil transfer device 40 to one surface of which the foil 41*a* transferred from the base sheet 41*b* from which the foil 41*a* is separated.

In the present embodiment, such foil transfer device 40 is used in place of the sheet conveying member 39 in the color printer 1. Similarly to the configuration disclosed in Japanese Unexamined Patent Application Publication No. 2020-16551, the foil transfer device 40 may be coupled to the color printer 1 as another device without being provided in the apparatus main body 2 of the color printer 1. In this case, it is not necessary to provide the contact-separation unit 43*a*, and the device configuration can be simplified.

An image forming method conventionally performed for an overprinting method using the color printer 1 having the above-described configuration, that is, an image forming operation of further forming an image on a surface of the foil portion formed on the transfer sheet S to form a foil image portion on the transfer sheet S will be described.

A foil portion forming step of forming a foil portion on the transfer sheet S will be described.

In a case of forming the foil portion on the transfer sheet S, similarly to the technology disclosed in Japanese Patent No. 5782893, a first step of forming a base image portion for transferring the foil 41*a* onto the transfer sheet S and a second step of transferring the foil 41*a* to the formed base image portion are performed.

One transfer sheet S is fed from the sheet feed tray 23 or 24, and the fed transfer sheet S is temporarily stopped by the registration roller pair 28.

Simultaneously with the feeding of the transfer sheet S from the sheet feeding unit 22, the process cartridge 3K operates to rotationally drive the photoconductor drum 4K. The optical unit 8B irradiates a peripheral surface of the photoconductor drum 4K with the laser beam corresponding to the foil portion to be formed, and an electrostatic latent image is formed thereon. The formed electrostatic latent image is developed by the developing device 6K, and the toner image corresponding to the foil portion to be formed is formed on the peripheral surface of the photoconductor drum 4K. When the primary transfer roller 16K operates, the toner image formed on the peripheral surface of the photoconductor drum 4K is primarily transferred onto the intermediate transfer belt 9. At the time of operation of the process cartridge 3K, the operation of each of the other process cartridges 3Y, 3M, and 3C is stopped.

Thereafter, the registration roller pair 28 operates in accordance with the timing of the toner image on the intermediate transfer belt 9, and the temporarily stopped transfer sheet S is fed toward the secondary transfer nip N. At the secondary transfer nip N, a predetermined transfer voltage is applied to the secondary transfer roller 17 in accordance with the traveling intermediate transfer belt 9 and the fed transfer sheet S, the toner image on the intermediate transfer belt 9 is transferred onto the transfer sheet S, and the base image portion 46 is formed on one surface of the transfer sheet S as illustrated in FIG. 2.

The transfer sheet on which the base image portion 46 is formed is conveyed to the fixing device 20 by the conveying conveyor 21. When the transfer sheet S sent to the fixing device 20 passes through the pressure contact portion between the heating belt 20*a* and the pressing roller 20*b*, the transferred base image portion 46 is fixed thereto by heat and pressure.

Figure 3:
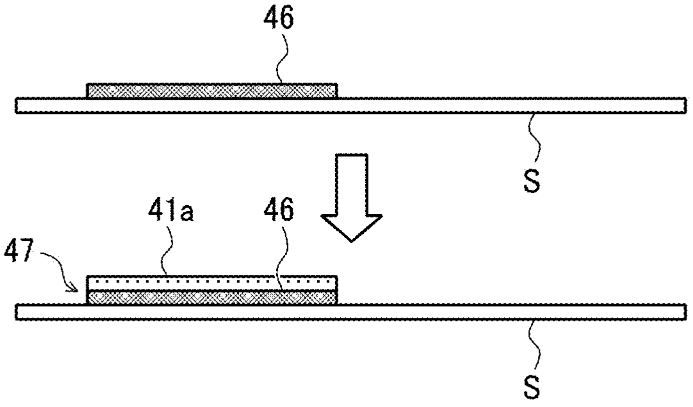
FIG. 3 is a schematic view illustrating a foil portion forming step according to an embodiment of the present disclosure.

The transfer sheet S to which the base image portion 46 is fixed is sent to the foil transfer device 40 provided in place of the sheet conveying member 39 on the downstream side in the sheet conveyance direction. In the foil transfer device 40, the pressing roller 43 occupies the separation position by the operation of the contact-separation unit 43*a*. When a sensor detects that the transfer sheet S is conveyed, the contact-separation unit 43*a* operates at a timing when the base image portion 46 reaches a position where the heating roller 42 and the pressing roller 43 face each other, and the pressing roller 43 is displaced from the separation position to the pressure contact position. At the same time, the core of the winding roll 44 rotates at the same conveyance speed as that of the transfer sheet S, and the foil base sheet 41*c* is fed from the foil supply roll 41. The foil 41*a* is brought into pressure contact with the base image portion 46 on the transfer sheet S by the displacement of the pressing roller 43 and the rotational driving of the core of the winding roll 44, and the foil 41*a* subjected to the pressure contact is transferred onto the base image portion 46 by heat and pressure. By this series of operations, as illustrated in FIG. 3, the foil 41*a* adheres onto the base image portion 46 on one surface of the transfer sheet S to form the foil portion 47, and the foil portion forming step is completed.

The transfer sheet S on one surface of which the foil portion 47 is formed is ejected to be stacked on the sheet ejection tray 31 by an operation of the ejection roller pair 30 in a case where further image formation, that is, the overprinting method is not performed.

After completion of the foil portion forming step, an image transfer step is subsequently performed.

The transfer sheet S that passes through the foil transfer device 40, on the base image portion 46 of which the foil 41*a* adheres and the foil portion 47 is formed is guided to the first reconveyance path 34 by the switching claw 33 after passing through the foil transfer device 40, and is further guided to the revolving conveyance path 48 by the switching claw 49. The transfer sheet S that passes from the revolving conveyance path 48 through the second reconveyance path 36 is conveyed to the registration roller pair 28 in its original posture, and is temporarily stopped by the registration roller pair 28.

Simultaneously with the reconveyance of the transfer sheet S from the revolving conveyance path 48, each process cartridge 3 operates to rotationally drive each photoconductor drum 4. Each optical unit 8 irradiates a peripheral surface of each photoconductor drum 4 with the laser beam corresponding to an image portion that forms the foil image portion formed on the transfer sheet S, and an electrostatic latent image is formed on the peripheral surface of each of the photoconductor drums 4 by the applied laser beam. Each formed electrostatic latent image is developed by each developing device 6, and a toner image corresponding to the image portion to be formed is formed on the peripheral surface of each photoconductor drum 4. When each primary transfer roller 16 operates, each toner image formed on the peripheral surface of each photoconductor drum 4 is primarily transferred onto the intermediate transfer belt 9, and a full-color toner image corresponding to the image portion is formed on the intermediate transfer belt 9.

Thereafter, the registration roller pair 28 is operated in accordance with the timing of the full-color toner image on the intermediate transfer belt 9, and the temporarily stopped transfer sheet S is fed toward the secondary transfer nip N.

Figure 4:
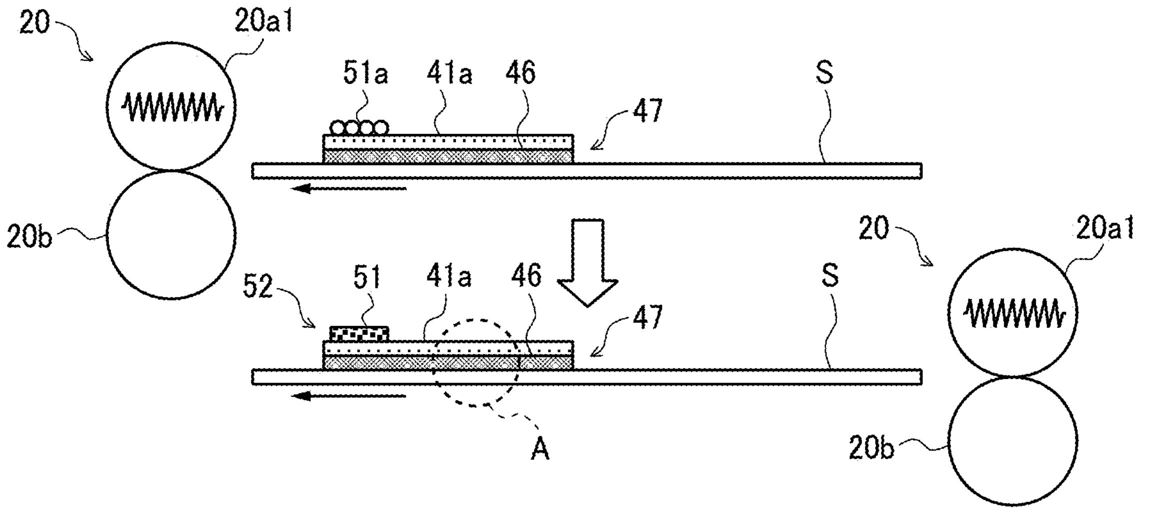
FIG. 4 is a schematic view illustrating an image transfer step and a fixing step of forming a foil image portion on a recording medium according to an embodiment of the present disclosure.

At the secondary transfer nip N, a predetermined transfer voltage is applied to the secondary transfer roller 17 in accordance with the traveling intermediate transfer belt 9 and the fed transfer sheet S, the full-color toner image on the intermediate transfer belt 9 is transferred onto the transfer sheet S. and the foil portion 47 including the base image portion 46 and the unfixed image portion 51*a* are formed on the transfer sheet S as illustrated in FIG. 4. The image transfer step is completed by the above-described series of operations.

At the above-described steps, the transfer sheet S that passes through the foil transfer device 40 on which the foil portion 47 is formed thereon is guided to the first reconveyance path 34 by the switching claw 33, and is further guided to the revolving conveyance path 48 by the switching claw 49 to be present to the registration roller pair 28. A configuration may be adopted in place of this in which the transfer sheet S to which the foil portion 47 is formed is ejected to the sheet ejection tray 31, the ejected transfer sheet S is stored again in the sheet feed tray 23 or 24, and the transfer sheet S on which the foil portion 47 is formed is fed from the sheet feed trays 23 and 24.

After the image transfer step is completed, the transfer sheet S on which the foil portion 47 and the unfixed image portion 51*a* are formed is conveyed to the fixing device 20 by the conveying conveyor 21. When the transfer sheet S sent to the fixing device 20 passes through the pressure contact portion between the heating belt 20*a* and the pressing roller 20*b*, the transferred unfixed foil image portion 51*a* is fixed by heat and pressure, and an image portion 51 is formed as illustrated in FIG. 4. A foil image portion 52 including the foil portion 47 and the image portion 51 is formed on the transfer sheet S, and the fixing step is completed.

The transfer sheet S on which the foil image portion 52 is formed after the fixing step is completed is guided by the switching claw 33 to be guided to the sheet ejection path 32, and ejected onto the sheet ejection tray 31 by the ejection roller pair 30. At that time, the contact-separation unit 43*a* locates the pressing roller 43 at the separation position, and the transfer sheet S passes between the rollers 42 and 43 of the foil transfer device 40. At that time, the pressing roller 43 may be rotationally driven by a driving unit to assist the conveyance of the transfer sheet S.

In the above-described embodiment, the foil image portion 52 in a state in which an entire image portion 51 is placed on the foil portion 47 is illustrated, but the foil image portion 52 is not limited thereto, and as long as the foil portion 47 and the image portion 51 are present on one surface of the transfer sheet S, the foil image portion 52 is formed even when the image portion 51 is not placed on the foil portion 47.

Disadvantages in the above-described conventional image forming method will be described below.

Figure 5:
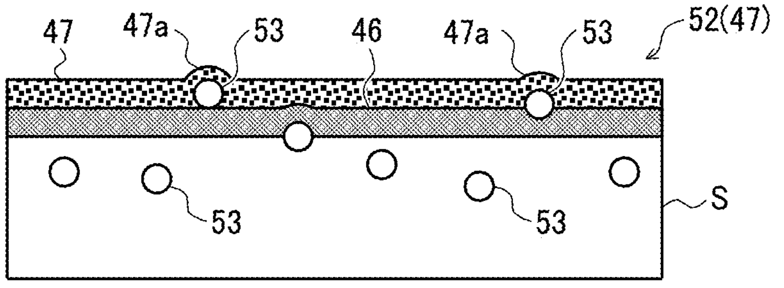
FIG. 5 is a schematic view illustrating an example of a disadvantage occurring at the time of a fixing step of forming the foil image portion on the recording medium.

In the conventional image forming method, as illustrated in FIG. 4, the unfixed image portion 51*a* is transferred onto the transfer sheet S on which the foil portion 47 is formed, and the transfer sheet S is fixed by the fixing device 20, thereby forming the foil image portion 52 including the foil portion 47 and the image portion 51. When the transfer sheet S that passes through the fixing device 20 is observed at the time of the fixing step, as illustrated in FIG. 5 in which a portion A illustrated in FIG. 4 is enlarged, it was found that a large amount of moisture is contained in the transfer sheet S, and the moisture is evaporated by the heat of the fixing device 20 to form a large number of bubbles 53. When the formed bubbles 53 appear on the surface of the foil portion 47, a large number of protrusions 47*a* as illustrated in FIG. 5 are formed on the surface of the foil portion 47, so that there is a disadvantage that the surface of the foil portion 47 is roughened to deteriorate glossiness of the surface of the foil portion 47.

Hereinafter, an image forming method according to an embodiment of the present disclosure that solves the above-described disadvantage will be described. In the image forming method according to an embodiment of the present disclosure, after the foil portion forming step described above is completed, a drying step of drying the transfer sheet S on which the foil portion 47 is formed is performed prior to the image transfer step. By performing this drying step, moisture contained in the transfer sheet S is removed, and generation of the bubbles 53 is suppressed to prevent generation of the protrusions 47*a* in the foil portion 47. Hereinafter, the drying step will be described.

After the foil portion forming step is completed, the transfer sheet S in which the foil 41*a* adheres on the base image portion 46 to form the foil portion 47 is guided to the first reconveyance path 34 by the switching claw 33 after passing through the foil transfer device 40, and is further guided to the switchback path 35 by the switching claw 49. When the roller pair 50 is reversely driven, the transfer sheet S reversed front and rear and back and forth is guided by the switching claw 38, and is resent to the secondary transfer region by the operation of the registration roller pair 28 via the second reconveyance path 36. At that time, the secondary transfer roller 17 occupies the separation position, and the transfer sheet S conveyed by the registration roller pair 28 is sent to the fixing device 20 via the conveying conveyor 21 after passing through the secondary transfer region.

Figure 6:
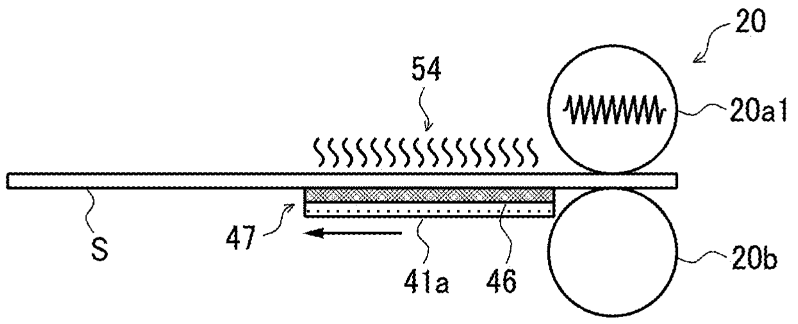
FIG. 6 is a schematic view illustrating a drying step according to an embodiment of the present disclosure.

Since the transfer sheet S sent to the fixing device 20 is reversed front and rear and back and forth from that at the foil portion forming step, as illustrated in FIG. 6, this is conveyed to the fixing device 20 in a mode in which one surface on which the foil portion 47 is formed faces downward. The transfer sheet S passes between the heating belt 20*a* and the pressing roller 20*b* of the fixing device 20. At the time of passing, the transfer sheet S passes through the fixing device 20 in a state in which the foil portion 47 faces the pressing roller 20*b* unlike at the foil portion forming step.

When the transfer sheet S passes, a control device 150 that controls an operation of the color printer 1 controls the temperature of the heating roller 20*a*1 so that the temperature of one side of the transfer sheet S facing the pressing roller 20*b* is lower than the temperature of the other side of the transfer sheet S facing the heating roller 20*al*, that is, the temperature on one surface of the transfer sheet S on which the foil portion 47 is formed is lower than the temperature of the other surface of the transfer sheet S on which no foil portion 47 is formed. Specifically, in a case where the conveyance speed of the transfer sheet S is 200 to 400 mm/sec, the temperature of the heating roller 20*a*1 side of the transfer sheet S is set to 160 to 200° C., and the temperature on the pressing roller 20*b* side of the transfer sheet S is set to 90° C. The control device 150 controls the operation of the motor that rotationally drives the driving roller 20*a*2 so as to satisfy the above-described conveyance speed based on a speed detected by a speed detector. At the same time, this controls the operation of the heating unit of the heating roller 20*a*1 so as to satisfy the set temperature described above based on the temperature detected by the temperature detector.

By performing the drying step described above, moisture contained in the transfer sheet S is vaporized and evaporated from the other surface of the transfer sheet S as vapor 54 as illustrated in FIG. 6. Therefore, since moisture contained in the transfer sheet S is evaporated, the bubbles 53 are not generated in the foil portion 47 formed on one surface of the transfer sheet S, the protrusion 47*a* is prevented from being formed in the foil portion 47, and the surface of the foil portion 47 is prevented from being roughened. As a result, it is possible to provide the image forming method that can obtain sufficient toner fixability while maintaining the glossiness of the surface of the foil portion 47 in an excellent state.

Since the temperature on the pressing roller 20*b* side is set to 90° C., which is lower than 100° C., moisture contained in the transfer sheet S is not vaporized on one surface of the transfer sheet S. and formation of the protrusions 47*a* on the foil portion 47 is prevented.

The temperature control of the pressing roller 20*b* will be hereinafter described.

In the description above, an example is described in which the temperature of the pressing roller 20*b* is set to 90° C. In the fixing device 20 of the present embodiment, since the pressing roller 20*b* and the heating roller 20*a*1 are brought into contact with each other via the transfer sheet S, the heat on the heating roller 20*a*1 side set to be higher than that of the pressing roller 20*b* is transferred to the pressing roller 20*b* side. Therefore, in order to control the temperature of the pressing roller 20*b* to be lower than that of the heating roller 20*al*, some cooling unit is provided for the pressing roller 20*b* side. An example of the cooling unit is a cooling fan that exhaust the heat on the surface of the pressing roller 20*b* out of the fixing device 20. As another example of the cooling unit, a configuration in which a heat pipe roller having excellent heat transportability is allowed to abut the pressing roller 20*b* to exhaust the heat on the surface is conceivable, but the cooling fan is preferably used as a simpler configuration.

From the viewpoint of heat transfer via the transfer sheet S described above, it is preferable that a temperature difference between the heating roller 20*a*1 and the pressing roller 20*b* is small, but if the set temperature of the heating roller 20*a*1 is too low, a sufficient sheet drying effect cannot be obtained in some cases. The temperature on the heating roller 20*a*1 side is preferably set to a temperature at which a sufficient drying effect according to the thickness of the transfer sheet S to be used can be obtained. For example, in order to obtain an excellent drying effect in a case where the thickness of the transfer sheet S is 0.2 to 0.3 mm, the temperature setting of about 170° C. is suitable in the present embodiment.

If the heating temperature with respect to the thickness of the transfer sheet S is too high, there is a possibility that wrinkles occur due to shrinkage of the transfer sheet S and defects such as image defects occur on a foil processed surface on the side opposite to a heating surface. For example, when the temperature of the heating roller 20*a*1 is set to 200° C. for the transfer sheet S having a thickness of0.1 mm, the possibility of occurrence of such defect increases.

An action and an effect of the present embodiment can be expected even if the set temperature of the pressing roller 20*b* is lower than 90° C., for example, 50° C. However, the lower the temperature setting of the pressing roller 20*b*, the larger the required output of the cooling unit, the air volume in a case of the cooling fan, and the more the cooling unit needs to be added, which is not preferable from the viewpoint of large scale and complexity of the apparatus. In an apparatus configuration using the cooling fan described above, the temperature of the pressing roller 20*b* is preferably set at around 90° C.

After the drying step is completed, the image transfer step of transferring an image to the transfer sheet S on which the foil portion 47 is formed to be dried is subsequently performed. After the drying step is completed, the transfer sheet S that passes through the fixing device 20 is guided by the switching claw 33 to be sent to the first reconveyance path 34, and then guided by the switching claw 49 to enter the switchback path 35. Thereafter, the transfer sheet S reversed front and rear and back and forth by the reverse driving of the roller pair 50 is guided by the switching claw 38, resent to the secondary transfer nip N via the second reconveyance path 36, and temporarily stopped by the registration roller pair 28. At that time, the transfer sheet S is conveyed with one surface facing the intermediate transfer belt 9.

A configuration may be adopted in which the transfer sheet S on which the foil portion 47 is formed to be dried is ejected to the sheet ejection tray 31, the ejected transfer sheet S is stored again in the sheet feed tray 23 or 24, and the transfer sheet S on which the foil portion 47 is formed is fed from the sheet feed trays 23 and 24.

However, since the transfer sheet S made of plain paper has high hygroscopicity, this absorbs humidity again when a time between the drying step and the image transfer step becomes long, and the above-described disadvantage is not solved. Therefore, the transfer sheet S on which the drying step is completed is preferably subjected to the image transfer step subsequent to the drying step as described above.

Simultaneously with the reconveyance of the transfer sheet S from the switchback path 35, each process cartridge 3 is operated to rotationally drive each photoconductor drum 4. Each optical unit 8 irradiates a peripheral surface of each photoconductor drum 4 with the laser beam corresponding to an image portion that forms the foil image portion formed on the transfer sheet S, and an electrostatic latent image is formed on the peripheral surface of each of the photoconductor drums 4 by the applied laser beam. Each formed electrostatic latent image is developed by each developing device 6, and a toner image corresponding to the image portion to be formed is formed on the peripheral surface of each photoconductor drum 4. When each primary transfer roller 16 operates, each toner image formed on the peripheral surface of each photoconductor drum 4 is primarily transferred onto the intermediate transfer belt 9, and a full-color toner image corresponding to the image portion is formed on the intermediate transfer belt 9.

The registration roller pair 28 operates in accordance with the timing of the full-color toner image on the intermediate transfer belt 9, and the temporarily stopped transfer sheet S is fed toward the secondary transfer nip N. At the secondary transfer nip N, a predetermined transfer voltage is applied to the secondary transfer roller 17 in accordance with the traveling intermediate transfer belt 9 and the fed transfer sheet S, and the full-color toner image on the intermediate transfer belt 9 is transferred onto the transfer sheet S. On the transfer sheet S, as illustrated in FIG. 4, the unfixed image portion 51*a* is formed on the foil portion 47, and the image transfer step is completed.

After the image transfer process is completed, the transfer sheet S on which the foil portion 47 and the unfixed image portion 51*a* are formed is conveyed to the fixing device 20 by the conveying conveyor 21. On the transfer sheet S sent to the fixing device 20, the unfixed foil image portion 51*a* transferred when this passes through the pressure contact portion between the heating belt 20*a* and the pressing roller 20*b* is fixed by heat and pressure, and the image portion 51 is formed as illustrated in FIG. 4. The foil image portion 52 including the foil portion 47 and the image portion 51 is formed on the transfer sheet S. and the fixing step is completed.

The transfer sheet S on which the foil image portion 52 is formed after the fixing process is completed is ejected to be stacked on the sheet ejection tray 31 via the switching claw 33, the sheet ejection path 32, and the ejection roller pair 30, as described above.

The image forming method according to an embodiment of the present disclosure includes the drying step between the foil portion forming step and the image transfer step. During the drying step, moisture contained in the transfer sheet S vaporizes and evaporates from the other surface of the transfer sheet S as the vapor 54, so that the bubbles 53 are not generated in the foil portion 47 formed on one surface of the transfer sheet S even when heated at the fixing step. As a result, it is possible to provide the image forming method that can prevent the protrusions 47*a* from being formed on the foil portion 47 at the time of the fixing step, prevent the surface of the foil portion 47 from being roughened, and obtain sufficient toner fixability while maintaining the glossiness of the surface of the foil portion 47 in an excellent state.

In the image forming method according to an embodiment of the present disclosure, the foil portion forming step includes a first step of forming the base image portion 46 on the transfer sheet S and a second step of transferring the foil 41*a* onto the base image portion 46, similarly to the conventional image forming method.

Each step is performed in a manner similar to that in the conventional technology, but the control device 150 that controls the operation of the color printer 1 sets the temperature of one surface of the transfer sheet S on which the base image portion 46 is formed at each step to be lower than the temperature of the other surface of the transfer sheet S opposite the one surface.

Specifically, at the first step, in a case where the conveyance speed of the transfer sheet S is 300 to 500 mm/sec, the temperature on the heating roller 42 side is set to 160 to 180° C., and the temperature on the pressing roller 43 side is set to 90° C.

At the second step, in a case where the conveyance speed of the transfer sheet S is 50 to 100 mm/sec, the temperature on the heating roller 42 side is set to 120 to 150° C., and the temperature on the pressing roller 43 side is set to 90° C.

Based on the temperature detected by the temperature detector, the control device 150 controls an operation of the heating unit of the heating roller 42 so as to satisfy the set temperature described above.

With the above-described configuration, the foil portion 47 can be excellently formed on the transfer sheet S. The conveyance speed of the transfer sheet S and the temperature on each roller side at the first step are not particularly limited as long as the conditions are set in such a manner that the base image portion 46 is excellently fixed to the transfer sheet S. However, as a result of experiments, it has been found that a higher amount of heat is often required at the time of toner fixing to the surface of the foil portion 47 (that is, the surface of the foil 41*a*) than at the time of toner fixing to the surface of the transfer sheet S. For this reason, the amount of heat (temperature/conveyance speed) at the first step is set to be smaller than the amount of heat (the conveyance speed of the transfer sheet S of 200 to 400 mm/sec, the temperature on the heating roller 20*a*1 side of 160 to 200° C., and the temperature on the pressing roller 20*b* side of 90° C.) at the fixing step.

The conveyance speed of the transfer sheet S and the temperature on each roller side at the second step are desirably set in such a manner that the amount of heat is smaller than the amount of heat at the fixing step. In a case where the amount of heat at the second step is made larger than the amount of heat at the fixing step, the surface of the foil 41*a* might be roughened due to an excessive amount of heat at the time of transfer of the foil 41*a* to the base image portion 46.

At each step, the temperature of one surface of the transfer sheet S to which the base image portion 46 is formed is set to be lower than the temperature of the other surface of the transfer sheet S opposite the one surface. Accordingly, it is possible to prevent moisture contained in the transfer sheet S from evaporating and adversely affecting the base image portion 46 and the foil portion 47.

In the present embodiment, the conveyance speed of the transfer sheet S and the temperature on each roller side at the fixing step are set to the same conditions as those at the drying step, that is, the conveyance speed of the transfer sheet S of 200 to 400 mm/sec, the temperature on the heating roller 20*a*1 side of 160 to 200° C., and the temperature on the pressing roller 20*b* side of 90° C. By setting in this manner, the drying step and the fixing step can be alternately performed using the single fixing device 20 without providing a standby time necessary for temperature control, and the image forming time can be shortened.

However, since the front and rear surfaces of the transfer sheet S are reversed between the drying step and the fixing step, it is desirable to make the amount of heat at the fixing step larger than the amount of heat at the drying step. If the amount of heat at the drying step is set to be larger than the amount of heat at the fixing step, a high amount of heat is provided to the foil portion 47 in a state in which a large amount of moisture is contained in the transfer sheet S, so that the bubbles 53 might be generated and the protrusion 47*a* might appear on the surface of the foil portion 47. In order to prevent the occurrence of this disadvantage, it is desirable to set the temperature of one surface of the transfer sheet S to be lower than the temperature of the other surface and set the temperature of one surface to be lower than 100° C. at the drying step. By setting similarly at the transfer step, the generation of the bubbles 53 from one surface of the transfer sheet S can be reliably prevented, and the roughness of the image surface in the foil image portion 52 can be prevented.

In the present embodiment, the drying step and the fixing step are performed using the single fixing device 20. With this configuration, the drying step can be performed using the existing fixing device 20 without newly providing a drying unit (drying device) in the apparatus main body 2, and the fixing device 20 can function as the drying unit to achieve cost reduction. However, in this configuration, since the transfer sheet S is conveyed in a reversed state with respect to the fixing device 20 between the drying step and the fixing step, the reverse conveying unit 37 is provided.

A drying unit may be provided in the apparatus main body 2 in addition to the fixing device 20, or the drying unit may be provided separately from the apparatus main body 2. According to such a configuration, it is possible to prevent the surface of the foil portion 47 from being roughened without providing the reverse conveying unit 37. However, as described above, in a case where the time between the drying step and the next transfer step is long, the transfer sheet S absorbs humidity again, and the effect of preventing roughness of the surface of the foil portion 47 due to drying is reduced. Therefore, in order to shorten the time between the drying step and the next transfer step and to simplify the apparatus, it is desirable to perform the drying step using the fixing device 20 provided in the apparatus main body 2.

In the present embodiment, the configuration in which the foil transfer device 40 as the foil portion forming unit for performing the foil portion forming step is provided inside the apparatus main body 2 is described. However, as described above, the foil portion forming unit may be provided in an apparatus different from the apparatus main body 2 to be coupled to the color printer 1 without providing the foil transfer device 40 in the apparatus main body 2 of the color printer 1. In this case, it is not necessary to provide the contact-separation unit 43*a*, and the apparatus configuration can be simplified, but a path is provided for conveying the transfer sheet on which the foil portion is formed from the foil portion forming unit to the color printer 1.

In the above-described embodiment, an example in which the color printer 1 is used as the image forming apparatus according to one embodiment of the present disclosure is described. However, an image forming apparatus according to an embodiment of the present disclosure is not limited thereto, and may be a copying machine, a facsimile, or a multifunction peripheral. In the present embodiment, a pressure by the pressing roller 20*b* is set to about 15 to 30 $N/cm^2$. Such pressure prevents early deterioration of the fixing device 20, and an excellent fixing quality can be obtained over a long period of time.

In the above-described embodiment, the transfer sheet S is used as the recording medium on which an image is formed. However, the transfer sheet S is not limited to a recording sheet. Examples of the transfer sheet include thick paper, a postcard, roll paper, an envelope, plain paper, thin paper, coated paper (coated paper and art paper), tracing paper, an overhead projector (OHP) sheet, an OHP film, and a resin film. Any material may be used as long as this has a sheet shape on which an image can be formed and has moisture absorbability. In the present embodiment, a pulp-based transfer sheet having a thickness of 0.2 to 0.3 mm is used. However, a recording medium made of a general material having excellent marketability may be used. By selecting a conveyance speed and a temperature condition suitable for the recording medium to be used without being limited to the conveyance speed and the temperature condition described in the present embodiment, a recording medium other than the recording medium described above may be used.

As described above, the base image portion 46 used in the present embodiment is more suitable because the effect of the present disclosure is obtained in a case where this is formed by the above-described system using toner. However, as long as the base image portion 46 can be formed on the transfer sheet S with similar components, the forming system is not limited to the above-described system, and an inkjet system may be used. Hereinafter, a schematic configuration of a droplet discharge apparatus to which an inkjet transfer system that can form the base image portion 46 on the transfer sheet S is applied will be described.

Figure 7:
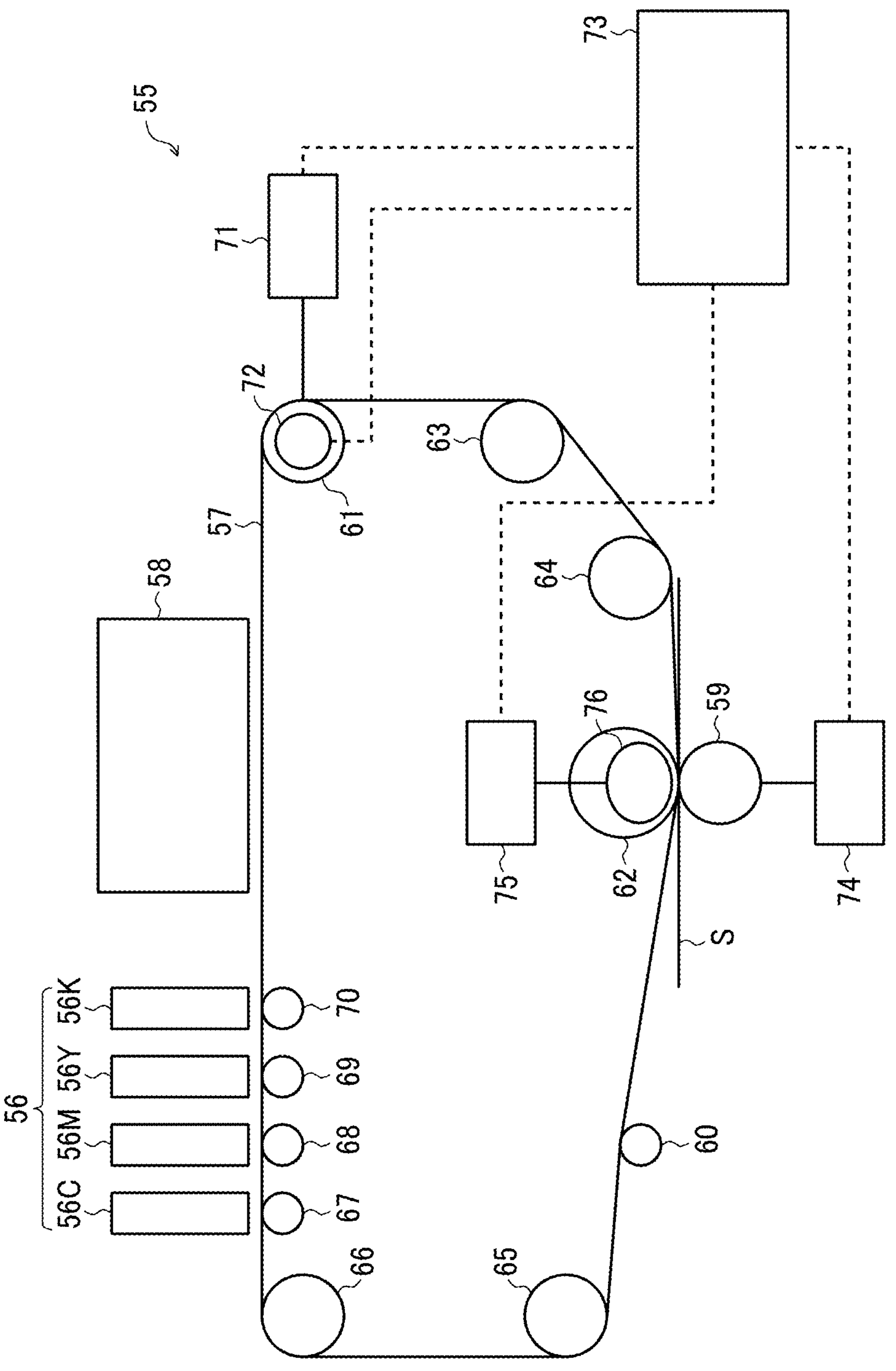
FIG. 7 is a schematic configuration diagram of a droplet discharge apparatus according to an embodiment of the present disclosure.

FIG. 7 illustrates a droplet discharge apparatus 55 as an image forming apparatus to which an inkjet transfer system that can form a base image portion 46 is applied. In the droplet discharge apparatus 55, a head unit 56 including droplet discharge heads 56C, 56M, 56Y, and 56K discharges droplets to form an image and a pattern on an outer peripheral surface of a transfer belt 57. The formed image and pattern are dried by a drying device 58 to form a film image on the transfer belt 57. Characters attached to the respective droplet discharge heads 56, are C for cyan, M for magenta. Y for yellow, and K for black, and a full-color image is formed by the head unit 56.

The film image formed on the transfer belt 57 is transferred to the transfer sheet S in a transfer unit where the transfer belt 57 faces a transfer roller 59. On a downstream side in a travel direction of the transfer belt from the transfer roller 59, a cleaning roller 60 that cleans a surface of the transfer belt 57 after transfer is disposed.

The transfer belt 57 is stretched around a driving roller 61, a transfer counter roller 62, four driven rollers 63, 64, 65, and 66, and four support rollers 67, 68, 69, and 70, and is driven to travel in a clockwise direction in FIG. 7 following the driving roller 61 driven and rotated by a transfer belt driving motor 71. An encoder 72 is attached to an output shaft of the transfer belt driving motor 71 driven and controlled by the control unit 73, and the control unit 73 controls driving of the transfer belt driving motor 71 based on an output signal from the encoder 72, thereby controlling a traveling speed of the transfer belt 57.

The four support rollers 67, 68, 69, and 70 are provided to face the droplet discharge heads 56C, 56M, 56Y, and 56K, respectively, and maintain a tensile state of the transfer belt 57 when droplets are discharged from the droplet discharge heads 56C, 56M, 56Y, and 56K.

The transfer roller 59 is rotationally driven by a transfer motor 74, and the transfer motor 74 is driven and controlled by the control unit 73. A cam 76 rotationally driven by a contact-separation motor 75 is attached to the transfer counter roller 62, and the contact-separation motor 75 is driven and controlled by the control unit 73, so that the transfer counter roller 62 comes into contact with and separates from the transfer roller 59. In this configuration, the configuration in which the transfer counter roller 62 is brought into contact with and separated from the transfer roller 59 is described, but a configuration in which the transfer roller 59 is brought into contact with and separated from the transfer counter roller 62 may be adopted.

With the above-described configuration, the film image formed on the transfer belt 57 can be transferred onto the transfer sheet S, so that the base image portion 46 can be formed on the transfer sheet S.

Next, a schematic configuration of a droplet discharge apparatus to which an inkjet image forming system that can form the base image portion 46 on the transfer sheet S is applied will be described.

Figure 8:
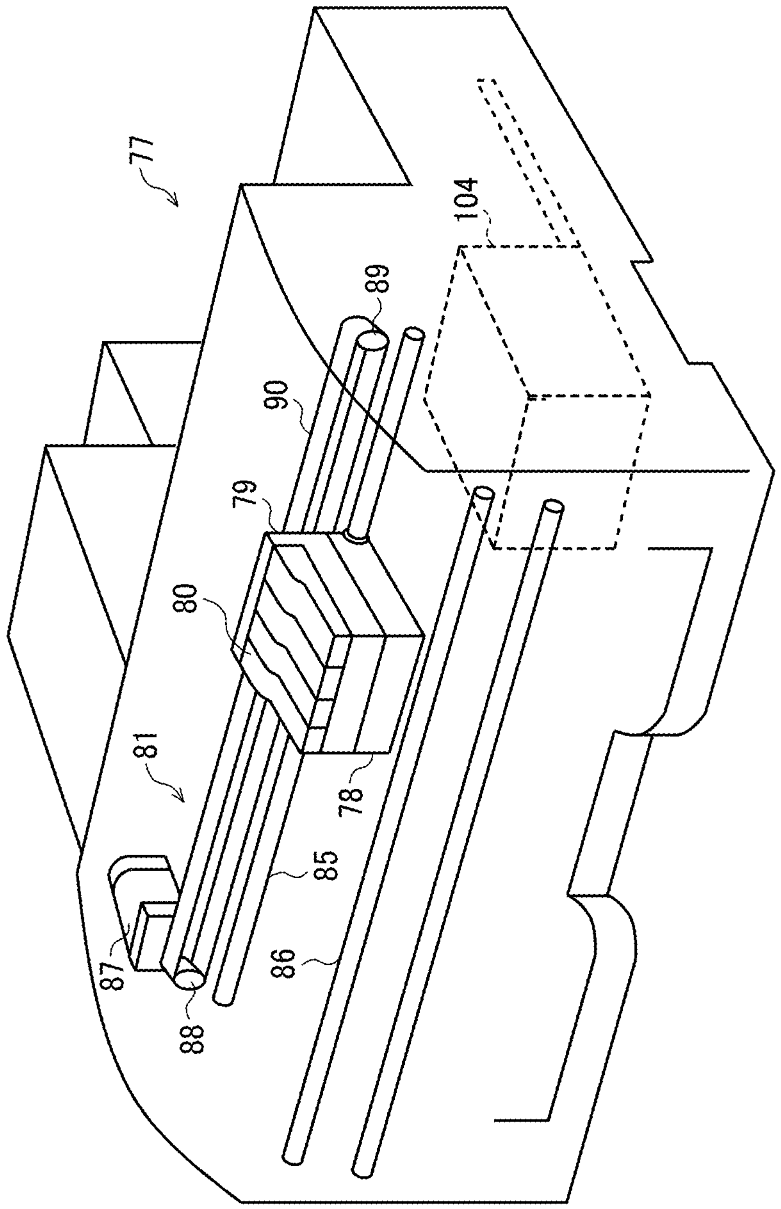
FIG. 8 is a schematic perspective view of the droplet discharge apparatus according to an embodiment of the present disclosure.
Figure 9:
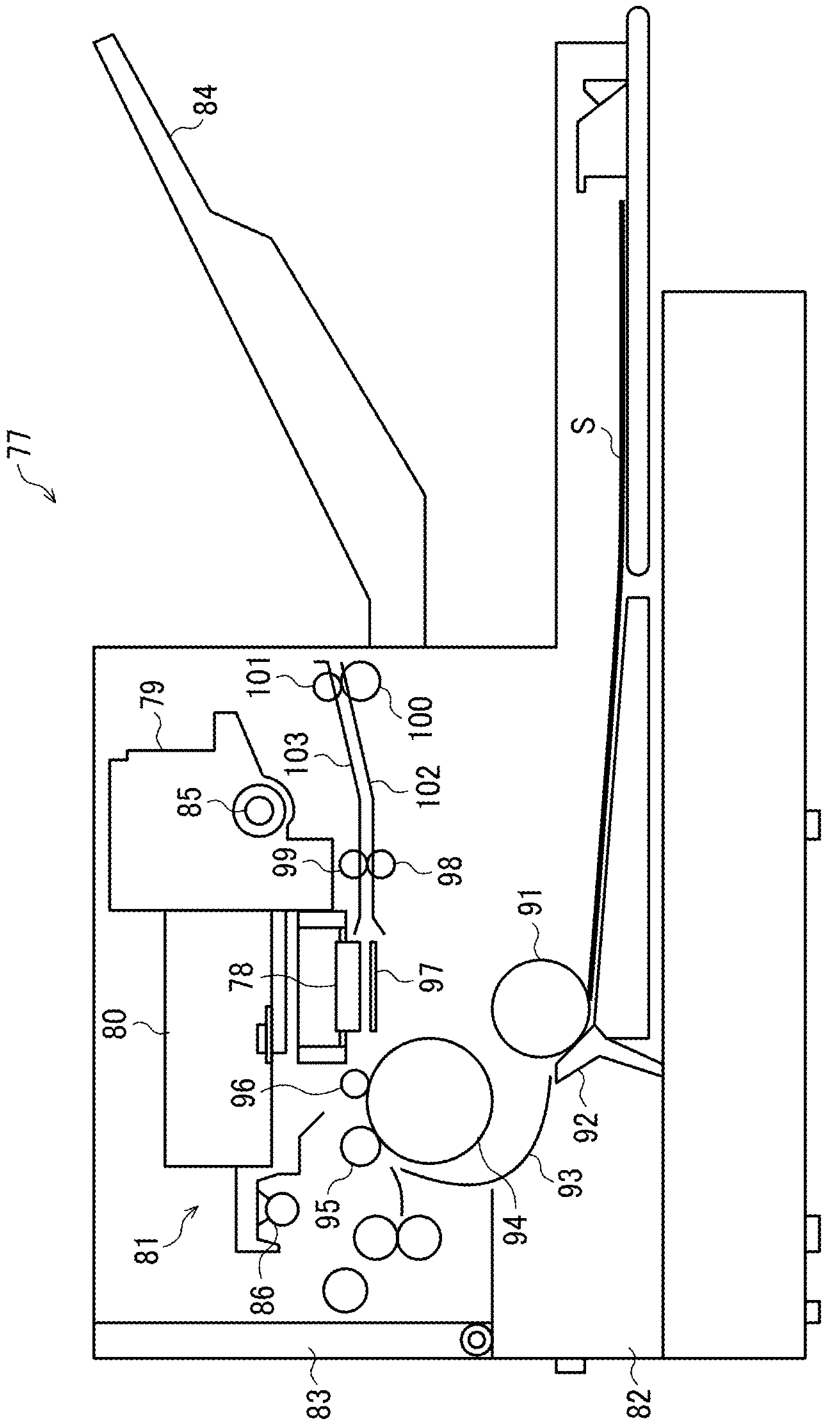
FIG. 9 is a schematic front view of the droplet discharge apparatus according to an embodiment of the present disclosure.

FIGS. 8 and 9 illustrate a droplet discharge apparatus 77 as an image forming apparatus to which the inkjet transfer system that can form the base image portion 46 is applied. The droplet discharge apparatus 77 includes a carriage 79 on which droplet discharge heads 78 of the respective colors of yellow, magenta, cyan, and black are mounted that is movable in a main scanning direction inside the apparatus main body. A droplet discharge unit 81 formed of each droplet discharge head 78 and an ink tank 80 that supplies ink to each droplet discharge head 78 are housed inside the apparatus main body. A sheet feed tray (which may be a sheet feed tray) 82 on which a large number of transfer sheets S as recording media can be stacked from a front side is detachably attached to a lower portion of the apparatus main body. The apparatus main body is also provided with a manual sheet feed tray 83 which is opened when the transfer sheet S is manually fed. The droplet discharge apparatus 77 takes in the transfer sheet S fed from the sheet feed tray 82 or the manual sheet feed tray 83, records a desired image by the droplet discharge unit 81, and then ejects the transfer sheet S after image formation to the sheet ejection tray 84 disposed on the rear side of the droplet discharge apparatus 77.

The droplet discharge unit 81 slidably holds a main guide rod 85, a sub guide rod 86, and the carriage 79, which are guide members stretched between left and right side plates in the main scanning direction. The carriage 79 is provided with droplet discharge heads 78 that discharge ink droplets of respective colors of yellow (Y), cyan (C), magenta (M), and black (Bk).

Each ink tank 80 that supplies ink of each color to each droplet discharge head 78 is attached to the carriage 79 in a replaceable manner. Each ink tank 80 includes an atmosphere port communicating with the atmosphere on an upper side and a supply port for supplying ink to each droplet discharge head 78 on a lower side. A porous body filled with ink is provided inside the ink tank 80, and the ink supplied to the droplet discharge head 78 is maintained at a slightly negative pressure by capillary force of the porous body.

The carriage 79 is slidably fitted to the main guide rod 85 on a downstream side in a sheet conveyance direction, which is a rear side, and is slidably placed on the sub guide rod 86 on an upstream side in the sheet conveyance direction, which is a front side. In order to move and scan the carriage 79 in the main scanning direction, a timing belt 90 is stretched between a driving pulley 88 and a driven pulley 89 which are rotationally driven by a main scanning motor 87, and the timing belt 90 is fixed to the carriage 79. With this configuration, the carriage 79 reciprocates by forward and reverse rotation of the main scanning motor 87.

In order to convey the transfer sheet S set in the sheet feed tray 82 to the lower side of the droplet discharge head 78, a sheet feeding roller 91 and a friction pad 92 for separating and feeding the transfer sheet S from the sheet feed tray 82 are disposed. A guide member 93 that guides the transfer sheet S and a conveying roller 94 that reverses and conveys the fed transfer sheet S are disposed. A conveying roller 95 pressed against a peripheral surface of the conveying roller 94 and a leading end roller 96 that defines a feeding angle of the transfer sheet S from the conveying roller 94 are provided. The conveying roller 94 is rotationally driven by a sub scanning motor via a gear train.

In order to guide the transfer sheet S fed from the conveying roller 94 at a position below the droplet discharge head 78 corresponding to a moving range of the carriage 79 in the main scanning direction, a print receiving member 97, which is a sheet guide member, is disposed. On the downstream side in the sheet conveyance direction of the print receiving member 97, a conveying roller 98 and a spur 99 that are rotationally driven to feed the transfer sheet S in the sheet ejection direction are provided. A sheet ejection roller 100 and a spur 101 that feed the transfer sheet S to the sheet ejection tray 84, and guide members 102 and 103 that form a sheet ejection path are disposed.

In the droplet discharge apparatus 77 described above, the droplet discharge head 78 is driven according to the image signal while moving the carriage 79 at the time of recording. As a result, ink is discharged onto the stopped transfer sheet S to record one row, then the transfer sheet S is conveyed by a predetermined amount, and recording of the next row is performed. When receiving a recording end signal or a signal indicating that a rear end of the transfer sheet S reaches a recording region, the droplet discharge apparatus 77 terminates the recording operation and ejects the transfer sheet S.

A recovery device 104 for recovering from discharge failure of the droplet discharge head 78 is disposed at a position deviated from the recording region on a right end side in the moving direction of the carriage 79. The recovery device 104 includes a suction cap, a pump, and a wiping device. The carriage 79 is moved to the side of the recovery device 104 during printing standby, and the droplet discharge head 78 is capped with the suction cap to keep a nozzle in the droplet discharge head 78 in a wet state, thereby preventing occurrence of discharge failure due to ink drying. By discharging ink not related to the recording in the middle of the recording, ink viscosities of all the nozzles are made uniform and a stable discharging state is maintained.

In a case where discharge failure occurs, the nozzle of the droplet discharge head 78 is sealed with the suction cap, and bubbles are sucked out together with the ink from the nozzle by the pump. The ink and dust adhered to the nozzle surface are removed by a wiping brush, so that it recovers from the discharge failure. The sucked ink is ejected to a waste liquid tank provided in a lower portion of the main body, and is absorbed and held by an ink absorber provided inside the waste liquid tank.

The base image portion 46 can be formed on the transfer sheet S by the droplet discharge head 78 by the droplet discharge apparatus 77 described above.

Aspects of the present disclosure are, for example, as follows.

According to a first aspect, an image forming method is to form a foil image portion including a foil portion and an image on a recording medium using an image forming apparatus. The image forming method includes: a foil portion forming step of forming the foil portion to which foil is adhered on one surface of the recording medium; an image transfer step of transferring the image to the one surface of the recording medium after the foil portion forming step; a fixing step of fixing the image transferred to the one surface of the recording medium by the image transfer step; and a drying step of drying the recording medium on which the foil portion is formed between the foil portion forming step and the image transfer step.

According to a second aspect, in the image forming method of the first aspect, the drying step is performed by heating the recording medium, and at the drying step, a temperature of the one surface of the recording medium to be lower than a temperature of the other surface of the recording medium opposite the one surface.

According to a third aspect, in the image forming method of the first aspect or the second aspect, the foil portion forming step includes a first step of fixing a base image portion, to which the foil is to be transferred, on the recording medium, and a second step of transferring the foil to the base image portion fixed to the recording medium. Each of the first step and the second step is performed by heating the recording medium, and at each of the first step and the second step, a temperature of the one surface is set to be lower than a temperature of the other surface of the recording medium opposite the one surface.

According to a fourth aspect, in the image forming method of any one of the first to third aspects, the fixing step is performed by heating the recording medium, and at the fixing step, a temperature of the one surface is set to be lower than a temperature of the other surface of the recording medium opposite the one surface.

According to a fifth aspect, in the image forming method of any one of the second to fourth aspects, the temperature of the one surface is lower than 100° C.

According to a sixth aspect, in the image forming method of any one of the first to fifth aspects, the image forming apparatus includes a fixing device that includes a heating device and a pressing device to fix the image transferred to the recording medium. The fixing step and the drying step are performed w % ben the recording medium passes through the fixing device.

According to a seventh aspect, in the image forming method of the sixth aspect, at the drying step, the recording medium is conveyed to the fixing device in such a manner that the one surface of the recording medium faces the pressing device in the fixing device, and the other surface of the recording medium faces the heating device in the fixing device, and at the fixing step, the recording medium is conveyed to the fixing device in such a manner that the one surface of the recording medium faces the heating device in the fixing device, and the other surface of the recording medium faces the pressing device in the fixing device.

According to an eighth aspect, an image forming apparatus to execute the image forming method of the seventh aspect using a recording medium on one surface of which a foil portion is formed includes an image forming device to form an image, a transfer device to transfer the image formed by the image forming device to the recording medium, the fixing device, and a reverse conveyor to reverse and convey the recording medium to the fixing device.

According to a ninth aspect, the image forming apparatus of the eighth aspect further includes a foil portion forming device to form the foil portion on the recording medium.

According to a tenth aspect, the image forming apparatus of the eighth or ninth aspect further includes a drying device to perform the drying step.

Although some embodiments of the present disclosure have been described above, the embodiments of the present disclosure are not limited to the above-described specific embodiments, and various modifications and changes can be made within the scope of the gist of the present invention recited in claims unless otherwise limited in the above description.

The effects described in the embodiments of the present disclosure are merely examples of the most preferable effects resulting from the present disclosure, and the effects according to the present disclosure are not limited to those described in the embodiments of the present disclosure.

The invention claimed is:

1. An image forming method to be performed by an image forming apparatus, the method comprising:

drying a recording medium which includes a foil portion;

transferring, after the drying, an image to one surface of the recording medium which includes the foil portion; and fixing the image transferred to the one surface of the recording medium to form a foil image portion including the foil portion and the image on the recording medium, wherein the image forming apparatus includes a fixing device that includes a heater and a presser to fix the image transferred to the recording medium, and the fixing of the image transferred to the one surface of the recording medium and the drying of the recording medium are performed when the recording medium passes through the fixing device, wherein the drying of the recording medium includes conveying the recording medium to the fixing device in such a manner that the one surface of the recording medium faces the presser in the fixing device, and another surface of the recording medium opposite the one surface faces the heater in the fixing device, and wherein the fixing of the image transferred to the one surface of the recording medium includes conveying the recording medium to the fixing device in such a manner that the one surface of the recording medium faces the heater in the fixing device, and the another surface of the recording medium faces the presser in the fixing device.

2. The image forming method according to claim 1, wherein the drying includes:

heating the recording medium; and setting a temperature of the one surface of the recording medium to be lower than a temperature of the another surface of the recording medium opposite the one surface.

3. The image forming method according to claim 1, further comprising:

fixing a base image portion, to which the foil portion is to be transferred, on the recording medium; and transferring the foil portion to the base image portion fixed to the recording medium, wherein each of the fixing of the base image portion and the transferring of the foil portion includes:

heating the recording medium; and setting a temperature of the one surface of the recording medium to be lower than a temperature of the another surface of the recording medium.

4. The image forming method according to claim 1, wherein the fixing of the image transferred to the one surface of the recording medium includes:

heating the recording medium; and setting a temperature of the one surface of the recording medium to be lower than a temperature of the another surface of the recording medium.

5. The image forming method according to claim 2, wherein:

the temperature of the one surface is lower than 100° C.

6. An image forming apparatus to execute the image forming method according to claim 1 using a recording medium including on one surface a foil portion, the image forming apparatus comprising:

an image former to form an image;

a transferer to transfer the image formed by the image forming device to the recording medium;

the fixing device; and a reverse conveyor to reverse and convey the recording medium to the fixing device.

7. The image forming apparatus according to claim 6, further comprising:

a foil portion former to form the foil portion on the recording medium.

8. The image forming apparatus according to claim 6, further comprising:

a dryer to dry the recording medium on which the foil portion has been formed, between forming of the foil portion and transferring of the image.

* * * * *